United States Patent [19]

Cain

[11] Patent Number: 4,860,135
[45] Date of Patent: Aug. 22, 1989

[54] THERMAL COMPENSATION MECHANISM FOR MAGNETIC DISK DRIVE DATA STORAGE UNITS

[75] Inventor: Michael A. Cain, Oklahoma City, Okla.

[73] Assignee: Magnetic Peripherals Inc., Minnetonka, Minn.

[21] Appl. No.: 207,080

[22] Filed: Jun. 16, 1988

[51] Int. Cl.$^4$ ............................................. G11B 17/00
[52] U.S. Cl. .................................. 360/97.02; 360/106
[58] Field of Search .............. 360/106, 104, 105, 109, 360/97.02–97.04, 77.01, 77.02, 77.05, 78.04; 318/634

[56] References Cited

U.S. PATENT DOCUMENTS 4,207,601  6/1980  Desai et al. ........................ 318/634
4,602,305  6/1986  Ghose .............................. 360/78.04

FOREIGN PATENT DOCUMENTS 0198569  11/1984  Japan .................................. 360/109
0237274  10/1986  Japan .................................. 360/109

Primary Examiner—Stuart N. Hecker
Assistant Examiner—David J. Severin
Attorney, Agent, or Firm—Edward P. Heller, III

[57] ABSTRACT

A magnetic disk memory data storage device has a unitary arm assembly mounted for rotation by an actuator for carrying the tranducers and shifting them across the disk surfaces. The assembly is subjected to varying temperature during normal operation of the device which causes differential rotation of the individual arms and consequent misalignment of them. In a design of interest, the arm nearest the deck is most affected. At least some of this misalignment can be compensated for by placing a slot in the edge of at least one arm and placing a body with a different thermal coefficient into the slot with an interference fit. If the body has a smaller thermal coefficient than the arm assembly's, the slot should be on the edge opposite the direction in which the misalignment occurs.

9 Claims, 2 Drawing Sheets

THERMAL COMPENSATION MECHANISM FOR MAGNETIC DISK DRIVE DATA STORAGE UNITS

BACKGROUND/INFORMATION DISCLOSURE STATEMENT

This invention pertains to data storage devices using as the recording medium disks coated with thin layers of magnetic material in which magnetic patterns may be created by a data transducer in relative motion with respect thereto. In the high data capacity implementation in which the invention may be used, the disks are made of a rigid material, usually aluminum, and are mounted for high speed rotation on a spindle. Usually in such a device a number of disks are carried on a single spindle. The spindle itself is mounted for rotation on a deck which carries the various subsystems of the complete drive unit. A motor either within the spindle or mounted below the deck provides torque for rotating the spindle.

The transducers which record the data on the disk and read it back are carried on arms which suspend them adjacent the disk surfaces. The arms are in a currently preferred design fixed to a central frame or body, all of which together form an arm assembly which is mounted for rotation on the actuator shaft adjacent the edges of the disks. The actuator shaft is fixed to the deck. The arm assembly is rotated by an adjacent actuator to position the heads at any desired radius with respect to the disk spindle axis. As the disks rotate, the transducers trace circular tracks on the disks concentric with the disk spindle axis, and it is in these tracks that data is recorded. Thus, for each arm assembly angular position, access to a number of tracks and all the data recorded in them is possible.

It turns out that design improvements which increase the amount of data recordable on a single disk surface of a particular size are cheap relative to the value added by the increased data capacity. One innovation which has substantially increased the density of data on disk surfaces involves the dedication of one disk surface to so-called servo data which is permanently recorded with great accuracy thereon in concentric servo tracks. The transducer assigned to the servo surface functions only for reading the servo data, and provides servo signals for a feedback control loop whose output is to the actuator which angularly positions the arm assembly. By properly interpreting these servo signals, the servo circuit can cause the actuator to either shift the servo head into a position above any desired servo track or, after doing this, enter the so-called track following mode which maintains the servo head in very accurate registration with the desired servo track. Even though there is unavoidable radial runout in the disk spindle of perhaps hundreds of $\mu$inches, the servo feedback control loop can maintain the servo transducer such that deviation from perfect registration of the servo transducer with the desired servo track is at worst one or two tens of $\mu$inches.

The servo loop and other technology relating to these disk-type data storage devices has now reached such a level of refinement that even small devices, say those having the popular 5.25 inch diameter disks, can store upwards of 10 megabytes (Mb) of data per disk surface. To achieve the stated quantity of data per disk surface, the data must be packed with very high real density. Thus, the number of separate tracks per radial inch must be very high, and in the present designs, is 1000 tracks per radial inch or higher.

It is important that the data transducers all be constantly maintained in precise alignment or registration with the desired data tracks, because if the alignment is not accurate, data cannot be read and recorded accurately. If misalignment between a data transducer and the desired track exceeds perhaps 15% of the track spacing, errors are likely to occur with unacceptable frequency. Thus, for a track density of 1000 tracks per inch (tpi), the maximum allowable misalignment between the individual data transducer and the nominal position of a data track to be read and recorded is $150\mu$ inches (approximately 4 $\mu$m.). Since an error in writing a particular data track may coincide with a similar error of opposite sign during reading, in fact the actual error must be held to approximately $\pm 75$ $\mu$inches, allocating the permitted error equally between the write and read operations.

The accuracy with which the servo transducer is held in alignment with a servo track by the feedback control loop makes this particular source of error a relatively minor cause of misalignment between the data transducers and their data tracks. There are, however, a number of other sources of alignment errors of the data transducers with the data tracks, among them being thermal change in disk radius, thermal tilt of the disk assembly, vibration of the transducer supports, and bearing runout. Many of these errors have been dealt with satisfactorily one way or another or have been found to be relatively minor.

In one particular disk drive design with which the inventor has worked, the single most significant source of data transducer misalignment with the data tracks arose from thermally induced misalignment of the servo head with the data heads. For the arm assembly design used in this disk drive unit, it has been determined that changes in the temperature within the enclosure housing the disks and arm assembly causes angular change in the alignment of the arms with respect to each other leading, of course, to misalignment of the heads with respect to each other. Such direct thermal effects are not uniform from individual arm assembly to assembly or from individual arm to individual arm in the same assembly, for some assemblies being as little as 80 $\mu$inches and in others as much as 180 $\mu$inches. In particular, it was found that the arm closest to the deck and the transducer carried on it was by far the most affected, with the alignment with respect to each other of the other arms and the transducers carried on them being relatively unaffected. The fact that the arm closest to the deck was most affected had a disproportionate effect on the misalignment of the data transducers with their tracks during track following operation because for reasons not important here, the transducer closest to the deck must be used as the servo transducer.

The reasons for such temperature-induced misalignment is not clear. It is known that the arm assembly is not bilaterally symmetrical, and this undoubtedly has a substantial effect. But theoretical calculations do not derive errors of this magnitude and in any case, do not explain the substantial variation from one assembly to another. It is clear that this effect is amplified by some other mechanism. One likely source is the high axial compressive loads placed on the arm assembly bearings during assembly. These preset loads are necessary to reduce radial runout in these bearings, which if present can cause very large positioning errors. Since it is difficult to tightly control the amount of axial load during manufacture, there is a wide range in load in installed arm assemblies. The arm assembly temperature changes causes changes in the length of the arm assembly. The temperature-induced arm assembly length changes can substantially change the loads on the arm assembly. These changing arm assembly bearing loads in conjunction with the asymmetry of the arm assembly could be the source of these temperature-dependent transducer misalignments. The difficulty of consistently establishing the initial loading could account for the differing amounts of maximum misalignment from arm assembly to arm assembly.

Whatever the mechanism, it is clear from statistical studies that the amount of misalignment between the servo arm and the data arms changes in approximate direct proportion to the change in temperature in the enclosure regardless of the maximum misalignment observable for a particular arm assembly. Further, it has been determined that the alignment error is always of the same sign regardless of the arm assembly unit involved, i.e. a data head can be observed to shift out of alignment with its data track in the same direction for every arm assembly. Thus if a data track is written at a particular temperature, immediately thereafter no temperature-induced misalignment between the data arm and servo arm will be present to cause misalignment between the data transducer and its track. If the misalignment between this particular data arm and the servo arm is then measured after the temperature has risen, say 10° F. a certain amount will be detectable. Its magnitude cannot be predicted a priori with total accuracy but its sign or direction will be known to be that which has been experienced with every other arm assembly of that design. Further, it can be reliably predicted that the misalignment is approximately linear with temperature changes. That is, for a 20° F. temperature rise for example, the misalignment will be very close to twice that for 10 ° F., and for a 5° F. temperature rise, approximately half that for 10° F. For temperature decreases, the misalignment will be in the opposite direction but still will have this proportional response to temperature changes. The amount of change in misalignment for a given temperature change will vary from arm assembly to arm assembly, but the change will nonetheless be proportional with respect to temperature.

Temperature changes in the enclosure occur of a variety of reasons. The ambient temperature may change. The enclosure slowly heats up as the unit remains in service for a length of time due to heat from the electronics and resistance losses in the actuator. Mechanical energy present in air turbulence and bearing friction is also converted into heat.

It should be noted that the initial alignment of the servo transducer with respect to the data transducers is irrelevant to transducer to track alignment during operation. The alignment of data transducers to data tracks is set when data tracks are first recorded, and only changes in alignment between the servo transducer and the data transducer after it records a track can cause transducer misalignment with a data track. Of course, after a first data track is recorded on a disk surface, it is necessary that the adjoining tracks be properly positioned with respect to it to prevent their interfering with each other.

The closest art known to the inventor are the following U.S. Pat. Nos.: 4,185,309; 4,194,226; 4,135,217; 3,720,930; 3,871,064; 3,872,575; 3,775,655; and 3,029,318. *Xerox Disclosure Journal,* Vol. 5, No. 5, Sept./Oct. 1980, p. 549, Thermal Servo System for Mechanical Positioning, is also of interest.

BRIEF DESCRIPTION OF THE INVENTION

The invention here greatly reduces the misalignment problems described above. Because temperature-caused misalignment of the servo arm with data arms has been determined to be the source of misalignment of the data transducers with their desired data tracks, whatever correction of servo arm misalignment is possible will correct misalignment of the data transducers with their data tracks. By determining statistically the range (in $\mu$inches, for example) of or average maximum temperature-caused misalignment experienced by arm assemblies, it is possible to greatly reduce this source of misalignment by introducing into the servo arm, temperature-dependent compensation means which at least partly correct for this misalignment. It is not even necessary to provide compensation which mimics the misalignment errors of a particular arm assembly. Simply reducing the servo arm misalignment will decrease the scrap rate in rough proportion to the reduction of misalignment.

The means for compensating for this misalignment which forms my invention involves the presence in the servo or other arm an area along an edge thereof having a slot extending transversely with respect to the length of the arm, and within the slot a body with an interference fit in the walls of the slot. The body within the slot is chosen to have a temperature coefficient of linear expansion, hereafter temperature coefficient, different from the temperature coefficient of the arm. The temperature coefficients of the body and the arm are chosen to cause temperature-induced distortion of the arm in which the body is placed which corrects at least in part the misalignment in the arm assembly. It is to be expected that usually the servo arm will have the body placed in it, but any of the arms showing a relatively large temperature-dependent misalignment with the other arms can have such a compensation insert. Placement and dimensions of the slot should be such that the arm assembly's strength and rigidity is not affected.

If the arm to be compensated experiences clockwise angular movement relative to the second arm during temperature increases, then the slot and body are located so that the greater temperature coefficient material as between the body and the material of the arm, is located on the leading edge of such relative angular movement of the arm. Thus, if the body has a smaller thermal coefficient than the arm material, the slot and the body must be placed on the side of the arm opposite to the direction of the misalignment the arm to be compensated experiences relative to the other arms as temperature increases. That is, if the servo arm before compensation tends to experience angular misaligning movement in a first direction, either clockwise or counterclockwise relative to the data arms during temperature increases, then the slot and body must be placed on the trailing edge of the servo arm, relative to the misaligning angular movement involved. If the body has a greater thermal coefficient than that of the arm, then it and the slot must be placed on the opposite side of the arm, i.e. on the side of the arm toward which the transducer shifts when temperature increase occurs. It may be seen that the slot and body in either case tends to retard the angular movement of the servo arm due to the lesser temperature coefficient of the material at the trailing edge of the compensated arm, and thus reduce the angular misalignment of the transducer relative to the arm assembly shaft and the other arms caused by a change in temperature. It is convenient to configure the slot with a circular enlargement in its base and use a simple round metal dowel or pin as the body.

In the bilaterally asymmetrical arm assembly structure discussed above, where the misalignment is confined to the arm nearest the deck, the temperature compensation structure is placed in this arm. The preferred embodiment employs a small stainless steel circular cylinder in the form of a dowel or pin pressed into the bottom of a slot on the side of the arm opposite the side to which the servo arm is misaligned by temperature increases. Stainless steel is chosen for the pin material because its thermal coefficient is smaller by about 25% than is that of aluminum. An interference fit with the sides of the slot is required for the pin so that as the temperature of the pin and the arm in which it's embedded decreases, the pin's contribution to the arm geometry is always present. The stainless steel pin tends to counteract the misalignment arising from the temperature change by causing the tension under which the edge of the aluminum arm in which the pin is placed to decrease as temperature increases and increase as temperature decreases. That is, the slower increase in diameter of the pin relative to the adjoining arm material as temperature rises, retards the shift in angular position which the transducer undergoes as a result of the temperature rise. An equivalent analysis is of course true for temperature decrease of the compensated arm.

It should be understood that this compensation mechanism is not equal to the amount of misalignment between the servo transducer and the data transducers, since the amount of compensation is based solely on the temperature of the compensated arm. Nonetheless, by properly choosing the size and position of the dowel, the amount of compensation may be controlled with sufficient accuracy to substantially improve the alignment of the transducer on the compensated arm with the other transducers whether the particular arm assembly is one which inherently has large misalignments during temperature changes, or has relatively small misalignments during such changes.

Accordingly, the purpose of the invention is to partially correct thermally induced misalignment between asymmetric arms which carry the transducers in a disk memory drive.

One feature of the invention is that it accomplishes the correction with a simple modification of the existing structure which does not require redesign of the arm assembly.

Another feature of the invention is that it accomplishes the correction without adding weight to, increasing the complexity of, or weakening the arm.

Yet another feature of the invention is that it functions in a purely passive manner and accomplishes the correction without involving any electronic controls or closed loop system.

Yet another feature of the invention is that it requires only one, or at most a few of the arms in a disk drive to be modified with the structure of the invention.

DESCRIPTION OF THE PREFERRED EMBODIMENTS

Disk Drive Structure

Figure 1:
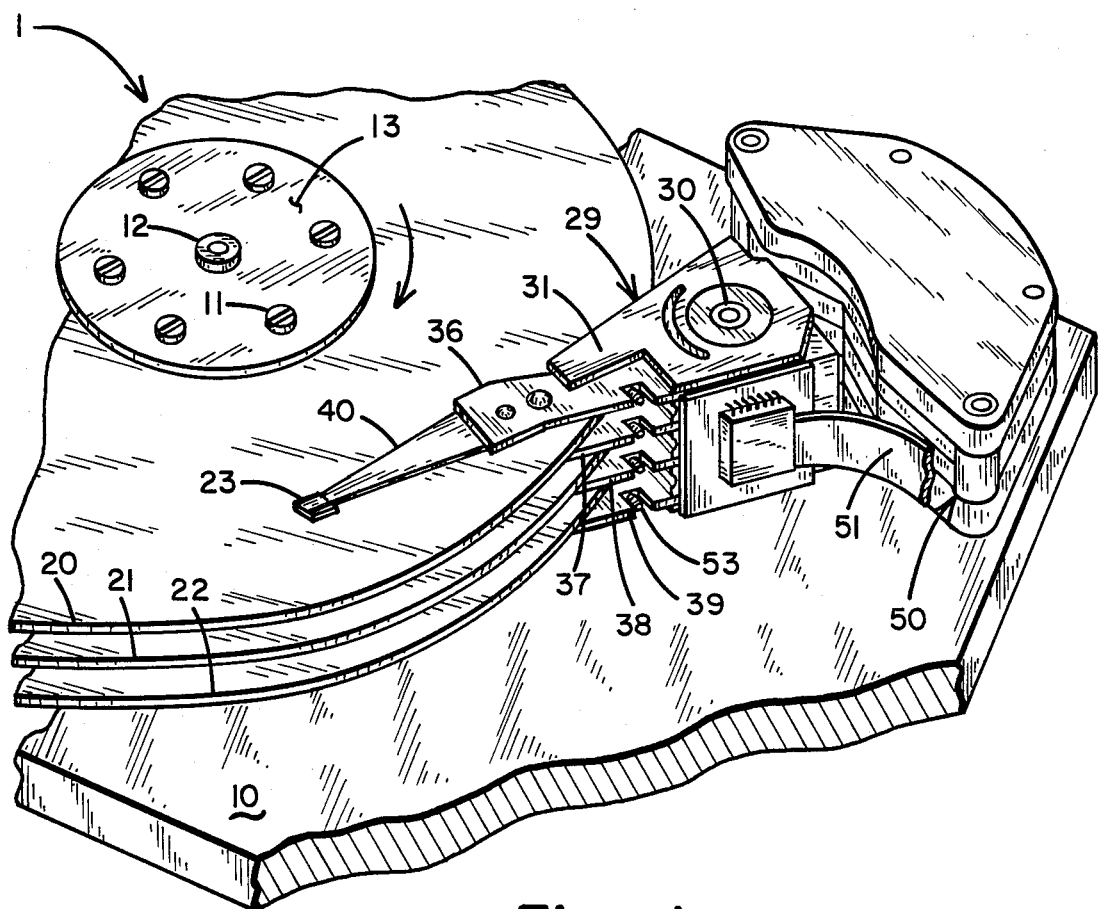
FIG. 1 is a perspective view of the interior of a disk drive unit, and which shows the transducer support assembly in which the invention may be advantageously employed.
Figure 2:
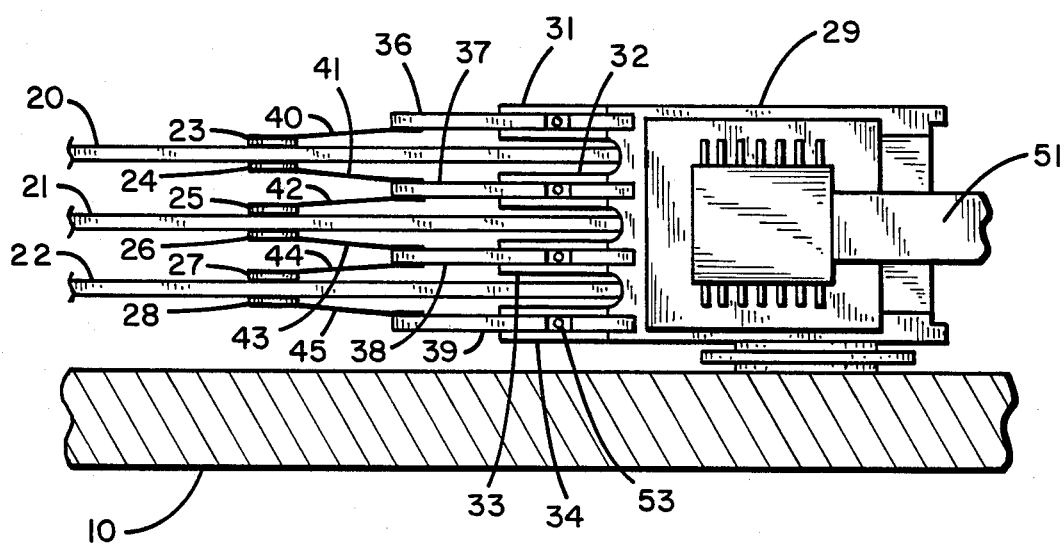
FIG. 2 is a near side elevation view of the interior of the transducer support assembly shown in FIG. 1.

To understand the invention, it is necessary to understand the structure of the disk drive device in which it is incorporated. FIGS. 1 and 2 show a part of the mechanical elements of a conventional state-of-the-art hard disk drive unit 1, including a deck 10 supporting these elements, and as such should be considered as part of the background. It should be understood that these elements are all contained in an enclosure which seals out contamination.

Disks 20, 21, and 22 are the actual recording elements, and have on each side a layer of a magnetic material in which may be created magnetic patterns which are representative of data to be stored. Of course, any number of disks from one to as many as 10 or more may be used with a proportionate change in the number of related elements. Each of the disk surfaces is very smooth. The disks, typically made from thin aluminum stock, are carried for rotation on a spindle 12, only the top of which is shown, mounted for rotation on the deck 10 adjacent the center of disk 22. The disks 20, 21, 22 are spaced from each other by spacers (not shown) and clamped together with fasteners 11 which pass through a flange 13 and are screwed into the top of spindle 12. The clamping is so tight that disks 20, 21, 22, the spacers, and spindle 12 all rotate as a solid unit. Disks 20, 21, 22 and spindle 12 are driven at a relatively high speed in the typical hard disk drive design, say 3600 rpm, by a spindle motor not shown, mounted beneath the deck 10.

Data is transferred onto individual disk surfaces and read from them by magnetic transducers 23–28 placed adjacent each disk 20, 21, 22 surface and supported in this relationship by a transducer support assembly. The transducer support assembly comprises a unitary arm assembly 29 mounted for rotation on a shaft 30, an end of which is fixed on deck 10. The arm assembly 29 can be rapidly rotated through a few tens of degrees at most by a magnetically-driven actuator 50 receiving electrical current from an appropriate amplifier which forms a part of the drive electronics, all of which is typically mounted under deck 10. In this way, the individual transducers 23–28 can be ideally shifted an identical radial amount to positions over a wide range of disk 20, 21, 22 radii. Arm assembly 29 in the design here may be conveniently made as an aluminum casting.

The arm assembly 29 in the particular design in which the invention has been commercially used includes four arms 31–34 thin enough to project into the spaces between the individual disks 20, 21, 22. In the embodiment for which the invention is intended, the arms 31–34 are an integral part of the arm assembly 29. The transducer support assembly also includes removable arm extensions 36–39 attached at the ends of the respective arm 31–34 and load springs 40–45 in turn attached to the end of the arm extensions 36–39. These elements are assembled to form the transducer support assembly as follows: load spring 40 is attached to the top outer arm extension 36 with transducer 23 carried at the free end of load spring 40 and adjacent the top surface of disk 20. Arm extension 37 carries load springs 41 and 42 at whose respective ends are carried transducers 24 and 25 respectively adjacent the bottom surface of disk 20 and the top surface of disk 21. Similarly, arm extension 38 carries load springs 43 and 44 with transducers 26 and 27 respectively attached in positions adjacent the bottom surface of disk 21 and the top surface of disk 22. The bottom arm extension 39 carries the load spring 45 with transducer 38 adjacent the bottom surface of disk 22. The bottom arm extension 39 is fastened to arm 34 by a machine screw 53, and the other arm extensions 36–38 are attached to the respective arms 31, 32, 33 by similar machine screws, unnumbered. Arms 31–34, arm extensions 36–39, and load springs 40–45 are all designed to have great stiffness in the tangential direction relative to the axis of arm assembly shaft 30. In addition, the arms 31–34 and arm extensions 36–39 have great stiffness in the radial and axial directions, again with reference to the transducer support assembly axis. The individual transducers 23–28 are aligned with each other so that all are at nearly the identical radial and angular positions respecting the axis of the disks 20, 21, 22. It is not necessary that exact alignment of transducers 23–28 occurs during manufacture. After writing of data occurs, however, it is essential that radial (with respect to the disks 20, 21, 22) changes of alignment between the transducers 23–28 be as small as possible, with maximum changes ideally limited to a few $\mu$inches (perhaps 0.2 $\mu$) at most. This permits the ideal very close radial spacing of the individual data tracks and consequent increased data capacity of the drive.

Since in this design the disks 20, 21, 22 turn at relatively high speed, any contact between the transducer 19 bearing surface and the disk 20 surface adjacent is likely to cause abrasion of one or the other. Therefore, each transducer's surface facing and sliding on the disk surface adjacent has a shape which causes it while the disk rotates to be supported by a very thin layer of air between itself and the adjacent disk surface. The load springs 40–45 are designed with the individual transducer 23–28 supported within a few microinches of the disk surface, and at the same time make contact between the transducer air bearing surface and the disk surface during operation a relatively rare event. The pressure provided by each load spring 40–45 balances the air bearing load capacity and allows the transducer to maintain a relatively constant spacing between its bearing surface and the disk 20 surface. Even though there are typically small projections on the disk surface which may change the clearance involved and the constantly flex in operation to prevent contact between the transducer air bearing surface and the adjacent disk surface.

Electrical communication between the drive electronics and the transducer 23–28 on board the transducer support assembly occurs via a flex lead 51. This allows data to be transferred to and from the transducers 23–28 and power supplied to the actuator 50 winding at the same time that the transducer support assembly is pivoting on its axis to radially position the transducers 23–28 on the disks 20–23.

One surface of a disk has a specially prepared magnetic pattern called the servo pattern written in it during manufacture, and this surface is never written on thereafter (assuming proper of the drive of course). It is preferable for reasons not here that the disk surface nearest the deck 10 be used for the servo pattern. The transducer 28 which reads this servo surface is usually referred to as the servo transducer. The servo pattern consists of a large number of concentric servo tracks with adjacent servo tracks having radii differing by a little as 20–25 $\mu$ or 0.0008–0.001$\mu$in. Each servo track has a magnetic pattern in it which the servo transducer can read and provide therefrom signals which accurately indicate the position of the transducer with respect to the individual track as well as identifying the individual track being read from among all of the others.

Actuator 50 is driven by a feedback control loop contained in the electronics of the drive 1. The feedback control loop has two modes of operation. During track following mode, the precise indication of the position provided by the servo transducer output is used to provide control signals from the actuator 50 amplifier to steer the servo transducer to maintain close registration with the desired track. Current technology as applied to the feedback control loop, the sensitivity and accuracy of the servo transducer signal, and spindle bearing design which minimizes radial disk runout, permits track following having maximum misalignment of the servo transducer with the desired servo track of less than 10 $\mu$inches, or about 0.25$\mu$. The feedback control loop also can provide signals responsive to external request signals to cause the actuator 50 to rotate the arm assembly 29 to shift the servo transducer 28 onto, and then to follow, any of the servo tracks.

Because of the rigid construction of the transducer support assembly, shifting servo transducer 28 to a desired servo track moves each of the other transducers 23–27 on its associated disk surface to a radial position allowing access to a data track uniquely determined by the position of the servo transducer 28. It has been determined that data can be written and then read at a later time with suitable accuracy if the maximum misalignment of a data transducer 23–27 with its data track, its tracking error, is approximately 15% of the track to track spacing. Thus, for track spacings of 0.001 in. (25$\mu$), the allowable maximum misalignment of a data transducer 23–27 is 150 $\mu$in. However, since the errors inherent in the writing of a data track may manifest themselves cumulatively on occasion with errors of exactly the opposite sign upon readback, in fact it is usually necessary to keep the total error in track registration for either a read or a write operation to about 7–8% of track spacing.

It is customary to deal with the individual contributions to misalignment of the data transducers 23–27 in the data tracks, from various sources of the errors, such as distortion of the arm assembly 29, servo transducer signal inaccuracy, and feedback control loop errors and instabilities, as simply parts of an error budget which must be held, in this example, to less than 100 $\mu$inches. It can be seen that the total data capacity of a drive unit is determined for a wide range of capacities, by a prudent error budget, and that reducing the maximum possible undeterminable change in the alignment of the servo transducer 28 with the data transducers 23–27 by even a few $\mu$inches allows significant increase of the capacity of the drive itself.

Explanation of Temperature-Related Errors

It has been found in practice that the transducer support assembly is subjected to changing ambient temperatures within the enclosure. These may arise from heat generated by the spindle drive motor, the electronics mounted under the deck 10, and the actuator 50; changes in the ambient temperature outside the drive enclosure; and the transformation of mechanical energy to thermal energy because of the rotation of the disks 20, 21, 22. Because of these various sources of heat, the temperature within the enclosure and of the transducer support assembly can easily change from minute to minute. For example, after a cold start, the drive motor, actuator 50, and electronics will produce large amounts of heat, with the result that heat transmitted through deck 10 causes warming of the transducer support assembly by an amount in the tens of degrees Celsius. Such a change in temperature has been determined to cause changes along the radii of disks 20, 21, 22 of the relative positions of transducers 23–28 with respect to each other. As explained earlier, such changes in the conventional designs can for certain of the installed transducer support assemblies exceed 150 μinches maximally over the total operating temperature range, and when the total tracking error budget is 200 μinches or less, this is a extremely significant source errors caused by data transducer misalignment in a particular disk drive 1.

Figure 3:
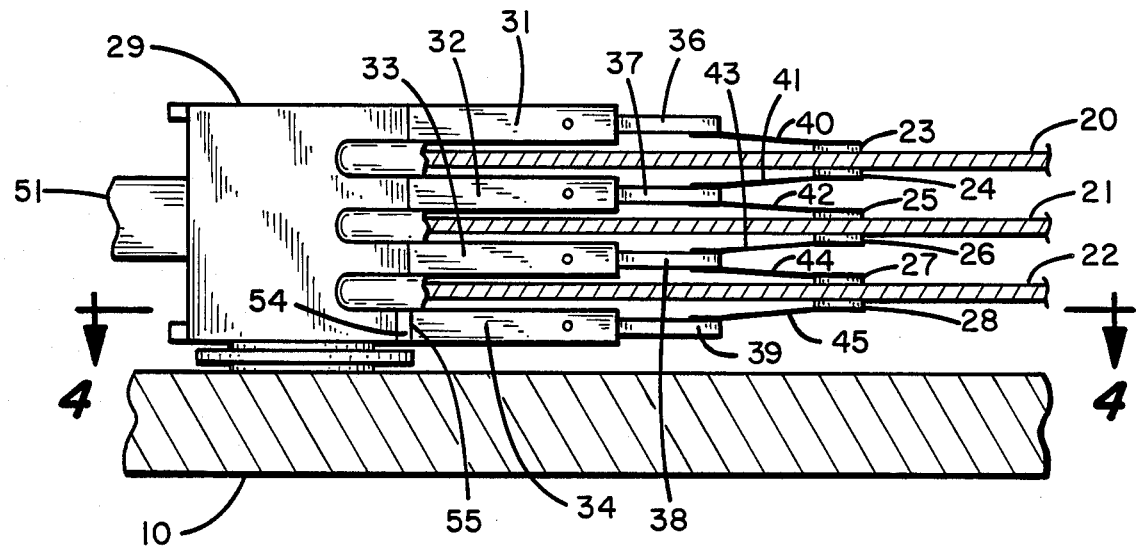
FIG. 3 is a far side view of the transducer support assembly shown in FIG. 1, including an edge view of the arm incorporating the thermal compensating structure of the invention and an edge view of the invention in place in the arm.
Figure 4:
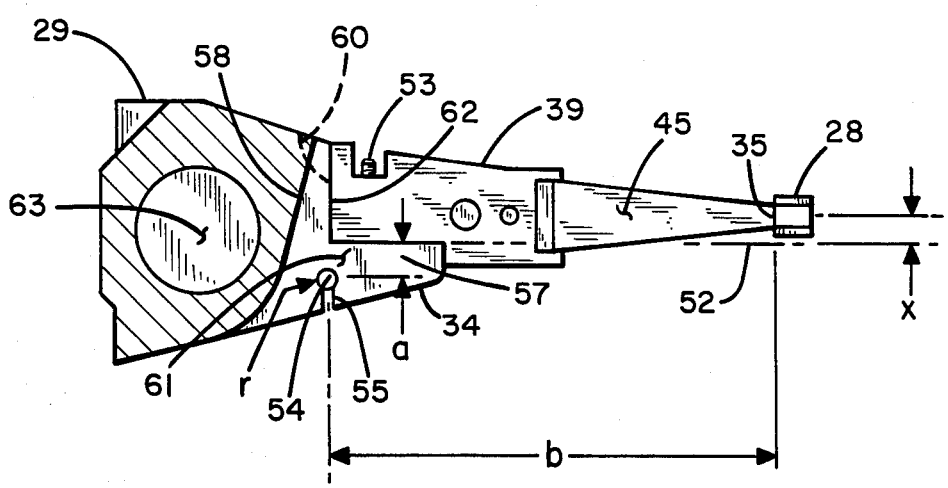
FIG. 4 is a projection view of a arm along the section specified in FIG. 3 showing the thermal compensating structure of the invention.

As mentioned earlier, it is not clear what mechanism is involved in generating this misalignment between individual ones of the data transducers 23–27 and the servo transducer 28. The misalignment is unlikely to occur in a transducer support assembly for whose arm assembly 29 can be drawn a plane containing the axis of rotation of arm assembly 29 and with respect to which arm assembly 29 has perfect bilateral symmetry. A candidate for such a plane is shown on edge in FIG. 4 as line 52. FIG. 4 is the section view 4—4 shown in FIG. 3, and shows servo arm 34 with its arm extension 39 and load spring 45 in projection. However, line 52 can be seen to not define the required bilateral symmetry because the cutout area in arm 34 to accommodate arm extension 39, as well as partial cutouts 58, 60 (shown in dotted outline) of arms 31–34, are all asymmetrical with respect to any radial line drawn from axis 61. Indeed, no line or plane involving such symmetry is available for the arm assembly 29 shown. While it is possible to redesign arm assembly 29, this requires a major retooling effort which is expensive and the time during the retooling delays introduction of the improved product.

As temperature changes cause axial compressive load on arm assembly 29 to change, it is believed that presence of these asymmetries cause the individual data arms 31–33 to shift angularly with respect to the servo arm 34 and the transducers 23–28 carried by the data arms 31–33 to be shifted relative to the servo transducer 28 carried on arm 34. It has been determined that while the individual data transducers 23–27 tend to stay in approximate alignment during temperature changes, the servo transducer 28 tends to lose alignment with the data transducers 23–27 during temperature changes. However, it has been discovered that the misalignment of the data transducers 23–27 with the servo transducer 28 is predictable as far as the direction in which the misalignment occurs, with misalignment between the data transducers 23–27 and the servo transducer 28 appearing as a clockwise rotation of the data transducers 23–27 with respect to the servo transducer 28 during a temperature increase. During a temperature decrease, data transducers 23–27 appear to rotate counter-clockwise with respect to servo transducer 28. And as mentioned earlier, the amount of misalignment is directly proportional to the temperature change.

Problem Solution

The solution here is to provide for a compensating thermal dimensional change to approximately counteract the temperature-generated misalignment, by distorting or bending arm 34 slightly. Accordingly, there is provided a slot 55 on the side of arm 34 toward which a temperature increase tends to shift data transducers 23–27 relative to servo transducer 28. At the bottom of the slot there is placed a pin or other member 54 which has a temperature coefficient which is less than the material from which arm 34 is constructed. Typically arm 34 is made of aluminum, and if so it is convenient to use a pin made from stainless steel. Pin 54 must have a tight interference fit in the bottom of slot 55, regardless of the temperature of the arm 34 during operation.

Consider what happens if arm assembly 29 warms. The arm 34 material between pin 54 and edge 62, viz. area 61, expands along line 52 more for a given temperature change than does pin 54 causing arm 34 to be distorted slightly. Because pin 54 is under compression at all times, area 57 of arm 34 tends to pivot clockwise around pin 54, in essence counteracting the angular changes undergone by arm 34 relative to arms 31, 32, 33. That is, the differential rates of expansion of the stainless steel in pin 54 and the aluminum of arm 34 causes the arm extension 39 to pivot to the left, clockwise, around pin 54 and thus at least in part compensate for the corresponding radial (with respect to the centers of disks 21, 22, 23) shift of servo transducer 28 relative to data transducers 23–27. It is important that there is clearance between the arm extension 39 and the arm assembly 29 along edge 62 as shown in FIG. 4. Any contact between these two elements can interfere with the predictability of the compensation, both with respect to an individual assembly 29 over time as well as with respect to the repeatability of the compensation from unit to unit.

It is necessary to properly choose both the radius "r" of pin 54 and the angular position of pin 54 on arm 34, that is its spacing "a" relative to edge 62 of arm 34, as well as spacing "b" of pin 54 from the read/write gap of transducer 28, so that the compensation provided properly corrects the misalignment in the relative position of transducer 28. In FIG. 4, the read/write gap of transducer 28 is located along the edge 35, although it is so small in comparison to the rest of the structure of FIG. 4 that it cannot be shown. In particular, dimensions r and a must be held to close tolerances. The tightness of fit of the pin 54 in the bottom of slot 55 is not particularly critical, however, so long as there is always interference between the sides of the hole and pin 54. It is interesting to note that the spacing of pin 54 from the axis of arm assembly 29 is not particularly critical. The compensation cannot ever be exact. Typically, the errors can be reduced by say, one half, and this improved performance more than justifies the slight additional cost of adding the invention to the arm assembly 29.

For a particular commercial version, the arm 34 and its attached arm extension 39 are made of aluminum and load spring 45 is made of stainless steel. Approximate dimensions are as follows:

Pin 54 offset from line 52, a=0.200 in.
Distance of pin 54 from read/write gap of transducer 28 projected to line 52, b=2.00 in.
Radius of pin 54, r=0.0313 in.
Temperature coefficient of aluminum arm 34, $Al_c = 11.7 \times 10^{-6}$ in./in./°F.
Temperature coefficient of stainless steel pin 54, $SS_c = 9.6 \times 10^{-6}$ in./in./°F.

An approximate calculation for the amount of compensation x which this invention yields as a function of the temperature change $\delta T$ is given by the formula $x = 2br\delta T(Al_c - SS_c)/(a+r)$. This approximation focuses on the differential change in length of the portion of the arm 34 in the area 61. It is assumed that the differential change in length of the aluminum arm 34 with respect to the stainless steel pin 54 operates over a length equal to the diameter of pin 54 in causing the arm 34 to deflect angularly as though centered on pin 54. It is also assumed that the steel is essentially incompressible relative to the aluminum although it is of course well known that the elastic modulus of steel is only about $2\frac{1}{2}$ times that of aluminum. The effect of this assumption is to impute the entire thermally induced elastic deformation to the aluminum. A third assumption is that the dimensional change resulting from temperature changes can be considered to act midway between the edge 62 of arm 34 and the center of pin 54. That is, the "lever arm" driving the dimensional change is $(r+a)/2$. This assumption is not readily apparent, but a detailed analysis (not included) of the entire structure indicates that it is probably correct.

$b/[(r+a)/2]$ is then the ratio of the lengths of the two lever arms involved. The temperature-induced differential change in lengths of the two sections of materials along the diameter of pin 54 is $2r\delta T(Al_c - SS_c)$. Multiplying the differential length change by the lever arm ratio involved yields the specified formula for x. It is useful to restate the equation in terms of compensation per degree of temperature change, which merely involves setting $\delta T = 1$, resulting in compensation of $2br(Al_c - SS_c)/(a+r)$ per °F. Calculation indicates that the compensation is approximately 1 $\mu$in./°F. for the dimensions stated above, which is approximately equal to the experimentally measured value of 1.1 $\mu$in/°F.

Stated more generally where the pin 54 may be of any material having a thermal coefficient $P_c$ and the arm 34 has in the area 61 a thermal coefficient $A_c$, the compensation per degree is $2br(A_c - P_c)/(a+r)$. Of course, $A_c$ and $P_c$ are stated in the temperature system in which the compensation desired is measured. If $A_c > P_c$, the compensation occurs as described above in terms of sign or direction. If $A_c < P_c$, the implication is that compensation occurs in the opposite direction. This is a useful capability, since the thermally generated errors may occur in either direction depending on the design of the arm assembly 29, and the overall design of arm assembly 29 may not allow freedom in the choice of the edge of the arm 34 in which the pin 54 is placed. Note for example, that some magnesium alloys and some zinc alloys have thermal coefficients higher than that of aluminum.

For geometries similar to that shown above, the analysis above can be used to make an estimate of the approximate size and location of a pin 54 suitable for any particular arm assembly with a misalignment with a predictable direction. It is certain that empirical studies will then be necessary to determine a set of preferred values for a and r, after choosing the materials of the arm 34 and pin 54. The formula above will allow the designer's first specification of dimensions to be fairly close to the final choices and thereby eliminate the need for undue experimentation. It is also possible to calculate approximations for these dimensions using more sophisticated simulations, but even these may require some reliance on the empirical approach. One should realize that the dimensions specified for the pin 54 size and location are suitable for only the arm dimensions, material, and shape shown.

It is important to prevent the very large errors present in some arm assemblies 29. Arm assemblies 29 having smaller errors will still typically have little effect on the overall performance of the disk drive unit in which they are installed. In specifying the dimensions of the compensation means, it is preferred that the largest errors be reduced even if the smaller errors are possibly increased. It is not the average error that must be minimized over a number of arm assemblies; it is the maximum errors that must be reduced, because it is these which cause failure of the unit to properly access all of its available disk surfaces.

Installation of pin 54 has reduced rejection rates in newly manufactured disk drives of the type described due to unacceptable numbers of tracking errors, from around 25% for those having uncompensated arm assemblies 29, to 3%. When one considers that each rejected disk drive unit 1 may cost several hundred dollars to rework, the value of this invention is readily apparent.

As mentioned above, it is likely possible to avoid these thermal errors by designing or redesigning the individual arm composites to be nearly perfectly symmetrical with respect to line 52. Current asymmetrical designs are liable to this thermal error because the mechanism described above and its temperature dependence has only recently been realized, and after the design had long been in production. However, when dealing with a mature product or subassembly for example, one prefers if at all possible not to make substantial tooling changes which may have unexpected and unpleasant ramifications in areas unrelated to that of current concern. Then too, there is the cost of retooling, which is not insignificant.

The preceding describes my invention for compensating for thermally induced tracking errors of asymmetrical arm assemblies in a disk drive.

Desiring to protect this invention by letters patent, what I claim is:

1. In a rotating disk media type magnetic data storage device having within enclosure at least one magnetic disk mounted for rotation on a deck, and a unitary arm assembly for supporting a plurality of transducers adjacent to the disk surfaces and for moving each transducer radially with respect to a disk, said arm assembly mounted for rotation on the deck, and having at least first and second bilaterally asymmetric arms projecting from the arm assembly's axis of rotation and each arm aligned adjacent to the surface of a disk and each carrying at its free end at least one transducer, and said arm assembly further formed of a material having a first temperature coefficient, and an actuator for rotating the arm assembly to position the transducers radially on the disk surfaces, said enclosure having heat sources changing the interior temperature with time, said heat sources affecting the temperature of one of said arms more than another, and said arm assembly experiencing changes in the relative angular position of a first arm of the arm assembly with respect to a second arm as a function of the relative changes in temperature, misalignment of the individual transducer carried by said first and second arms resulting misalignment of the first and second arms, comprising in the first arm an area along an edge thereof having a slot extending transversely with respect to the length of the arm, and within the slot, a body with an interference fit in the walls of the slot, said body having a second temperature coefficient different from the first temperature coefficient, whereby the different temperature coefficients of the body and the arm cause temperature-induced distortion of the first arm in which the body is placed which compensates at least in part the misalignment in the arm assembly.

2. The arm assembly of claim 1, wherein the body comprises a circular cylinder.

3. The arm assembly of claim 2 wherein the amount of compensation needed per degree is approximated by the expression $2br(A_c - P_c)/(a+r)$, and wherein the arm assembly includes an arm and pin having thermal coefficients of respectively $A_c$ and $P_c$, said pin having a radius of r and whose center is spaced from the read/write gap of the transducer by b, and which pin center is further spaced a distance a from the edge of the arm opposite that of the edge carrying the slot.

4. The storage device of claim 2, wherein the cylinder comprises steel and the arm assembly comprises aluminum.

5. The arm assembly of claim 4, wherein the body has a temperature coefficient larger than that of the first arm, and the slot and body are located on the leading edge of such relative angular movement of the arm.

6. The arm assembly of claim 1, wherein the first arm when uncompensated experiences angular movement of a first direction relative to the second arm during temperature increases, and the slot and body are located so that the greater temperature coefficient material as between the body and the material of the arm, is located on the leading edge of such relative angular movement of the first arm.

7. The arm assembly of claim 6 wherein the body has a temperature coefficient smaller than that of the first arm, and the slot and body are located on the trailing edge of such relative angular movement of the arm.

8. The arm assembly of claim 1, wherein the body comprises steel and the first arm comprises aluminum.

9. The arm assembly of claim 8, wherein the body comprises a circular cylinder.

* * * * *